March 14, 1967 R. D. BREWER ETAL 3,309,609
ELECTRICAL SPEEDOMETER WITH ELECTRICAL ENERGY REGULATING MEANS
Filed Oct. 3, 1963

RICHARD D. BREWER
BERNARD G. RADIN
INVENTORS

BY
J. R. Faulkner
K. L. Zerschling
ATTORNEYS

United States Patent Office 3,309,609
Patented Mar. 14, 1967

3,309,609
ELECTRICAL SPEEDOMETER WITH ELECTRICAL ENERGY REGULATING MEANS
Richard D. Brewer, Dearborn, and Bernard G. Radin, Oak Park, Mich., assignors to The Ford Motor Company, Dearborn, Mich., a corporation of Delaware
Filed Oct. 3, 1963, Ser. No. 313,663
5 Claims. (Cl. 324—70)

This invention relates to an electrical speedometer for an automotive vehicle and more particularly to such a speedometer in which a regulating means is employed to regulate the energy available at the receiver of the electrical speedometer.

Conventional electric speedometers may employ a sender connected in series with a source of electrical energy and a receiver. The receiver may be an electrical motor in which the motor windings are sequentially energized by the sender, and the rotor is revolved in synchronism with the sequential energization of the windings. This rotor may be attached to a conventional speedometer mechanism or indicating means for indicating vehicle speed. The sender may be a conventional commutator switch that sequentially energizes the windings of the receiver.

It can be appreciated that the reactance of the receiver windings increases as the speed of the vehicle increases since these windings are energized at a frequency proportional to vehicle speed by means of the sender. At high speeds, the inductive reactance may be so large that sufficient current to actuate the indicating means may not flow through the windings of the receiver. If the inductive reactance is made sufficiently low at these high speeds, it may be so low at low speeds that excessive current is drawn. This may damage the electrical components of the speedometer system or otherwise cause a severe drain on the electrical system of the vehicle.

In order to remedy the above-mentioned disadvantages of a conventional electrically operated speedometer, the present invention employs a regulator positioned in circuit with the receiver and sender. This regulator regulates the supply of electrical energy to the windings of the receiver as a function of vehicle speed. In other words, as the speed of the vehicle increases, the regulator will permit increasing amounts of electrical energy to be available at the receiver or electric motor windings.

In the preferred form of the invention, a solid state device, for example, a transistor, is used and the conduction of this solid state device is varied in accordance with vehicle speed. This may be accomplished by connecting a capacitor to the control circuit of the solid state device or transistor and charging this capacitor by means of a plurality of diodes, each connected to one of the receiver windings. These diodes are poled so that the capacitor is charged in a direction to increase the conduction of the solid state device or transistor as the speed of the vehicle increases.

An object of the invention is the provision of an electrical speedometer for an automotive vehicle in which the supply of electrical energy is properly regulated for all vehicle speeds.

Another object of the invention is the provision of an electrical speedometer for an automotive vehicle in which the energy supply available to actuate the electrical speedometer is sufficient at all vehicle speeds and is not so great at low speeds as to damage the speedometer components or cause too great a drain on the vehicle electrical system.

Other objects and attendant advatanges of the present invention will become more apparent as the specification is considered in connection with the attached drawing in which.

Figure 1:
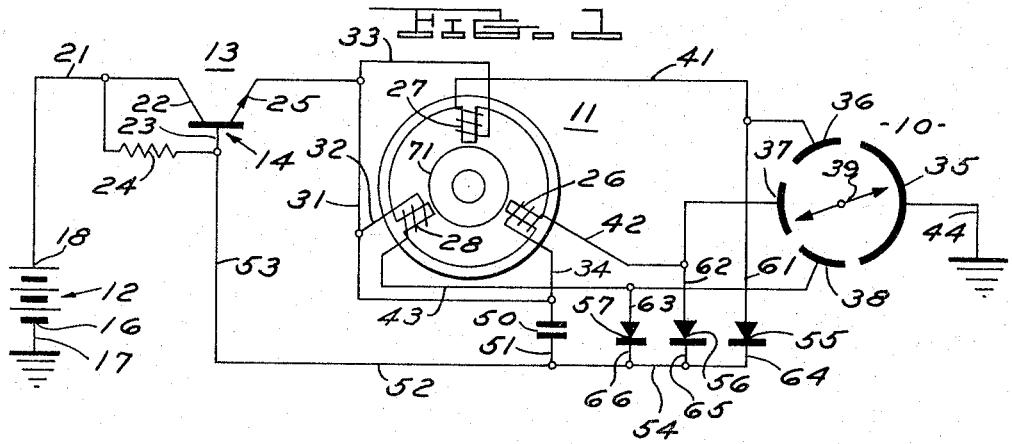
FIGURE 1 is a schematic or circuit diagram of the invention.

Referring now to the drawings in which like numerals designate like parts throughout the several views thereof, there is shown in FIGURE 1 the electrical speedometer system of the present invention. This system includes a sender 10 that energizes a receiver 11 from a source of electrical energy 12 in accordance with the speed of the vehicle.

A regulator 13 in the form of a solid state electrical device preferably a transistor 14, is connected in circuit with the source of electrical energy 12 and the receiver 11 for regulating the amount of electrical energy available to the receiver 11 in accordance with the speed of the vehicle. In other words, as the speed of the vehicle increases the amount of electrical energy available to the receiver 11 from the source or battery 12 increases.

The battery 12 includes a negative terminal 16 connected to ground through a lead 17 and a positive terminal 18 connected through a lead 21 to the collector 22 of the transistor 14. The base 23 of the transistor 14 is connected to the lead 21 and the positive terminal 18 of the battery 12 through a resistor 24. The emitter 25 of the transistor 14 is connected to the windings 26, 27 and 28 of the receiver 11 by means of a common lead 31 and individual leads 32, 33 and 34 respectively. The receiver 11 may take the form of an ordinary synchronous motor, and it will be described in greater detail subsequently.

The sender 10 may take the form of a commutator type switch having conductive segments 35, 36, 37 and 38, and a rotating arm 39 that simultaneously contacts the conductive segment 35 and any one of the conductive segments 36 through 38. The rotatable conductive arm 39 is adapted to be driven from a rotatable portion of a motor vehicle, the angular speed of which is proportional to the speed of the vehicle. For example, this rotatable conductive arm 39 may be driven from the drive shaft that connects the transmission with the rear wheels of the vehicle. It could also be driven from any of the vehicle wheel shafts.

Conductive segment 36 of the sender or commutator switch 10 is connected to winding 27 of the receiver 11 through a lead 41, conductive segment 37 is connected to the winding 26 through a lead 42, and conductive segment 38 is connected to winding 28 through a lead 43. The conductive segment 35 is connected to ground through a lead 44.

One terminal of a capacitor 50 is connected to the emitter 25 of transistor 14 and to one terminal of each of the electrical motor or receiver windings 26, 27 and 28, through the lead 31. The other terminal of the capacitor 50 is connected to the base 23 of the transistor 14 by means of leads 51, 52 and 53. The other terminals of the windings 26 through 28 of the electrical motor or receiver 11 are connected to a lead 54 by means of diodes 55, 56 and 57 respectively. The lead 54 is in turn connected to the terminal of the capacitor 50 that is connected to the base 23 of transistor 14 through the lead 51. More specifically, the anodes of diodes 55 through 57 are connected to leads 41, 42 and 43 by means of leads 61, 62 and 63, and hence to windings 27, 26 and 28 respectively, while the cathodes are connected to lead 54 through leads 64, 65 and 66.

Figure 2:
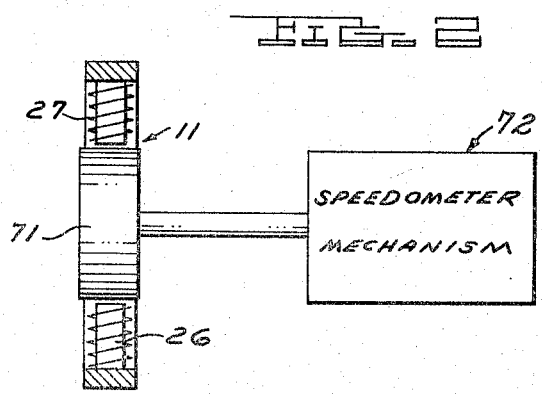
FIGURE 2 is a schematic showing the connection of a standard speedometer indicating means to the rotor of the receiver.
Figure 3:
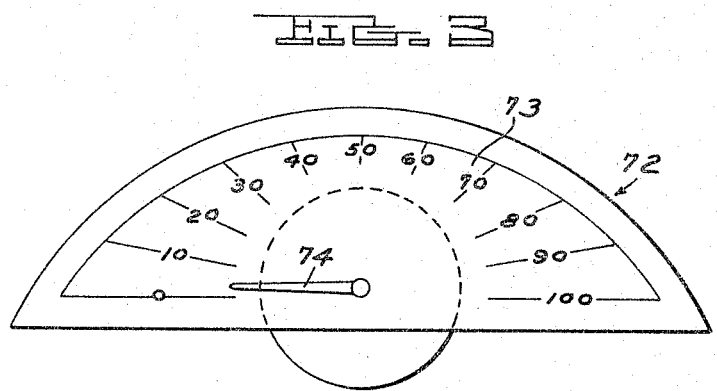
FIGURE 3 is a front view of the indicating means of the speedometer shown in FIGURE 2.

The rotor of the electrical motor or receiver 11 is designated by the numeral 71, and it may be of the permanent magnet type. This permanent magnet rotor 71 is shown in FIGURE 2 connected to a speedometer mechanism 72. This speedometer mechanism is shown in elevational view in FIGURE 3 and includes a standard indicia plate 73 and an indicator means in the form of a pointer or indicator hand 74. This speedometer mechanism 72 may be of the standard eddy current cup type as typified in Patent 2,073,153, issued Mar. 9, 1937, to R. O. Helgeby. The rotor 72 is attached to the input shaft of this mechanism, and the indicator hand 74 will be driven through the standard eddy current cup mechanism against the bias of a hairspring to indicate the speed of the motor vehicle.

In operation of the speedometer, the rotatable conducting arm 39 of the sender 10 will be rotated in accordance with vehicle speed. As a result, it will sequentially connect the conductive segments 36, 37 and 38 with the conductive segment 35, and this will sequentially energize the windings 26, 27 and 28 of the receiver 11 from the source of electrical energy 12 through the load or emitter-collector circuit of the transistor 14. This action will rotate the rotor 71 at a speed proportional to vehicle speed, and the speedometer mechanism 72, including the indicia plate 73 and pointer or indicator hand 74, will give an indication of this speed to the vehicle operator.

It can be appreciated that the inductive reactance of the receiver windings 26, 27 and 28 increases as the frequency of energization increases due to the increase of vehicle speed. At high vehicle speeds this inductive reactance may be quite large compared to that existing at low vehicle speeds.

The purpose of the regulating system of the invention, including the transistor 14, the capacitor 50, and the diodes 55, 56 and 57, is to make available to the windings 26 through 28 from the source of electrical energy 12, sufficient electrical energy to properly operate the speedometer mechanism 72 at all vehicle speeds. As vehicle speed increases, this regulating means will permit electrical energy of greater magnitude to be available to energize the windings 26 through 28 thus overcoming the increased inductive reactance and permitting sufficient current to flow through these windings.

An explanation of this action will now be given. In a NPN type transistor, as shown, the base 23 must be biased positive with respect to the emitter 25 to permit conduction. The purpose of the resistor 24 is to provide a minimum bias for the transistor 14 to provide minimum conduction when the vehicle is at standstill or operating at low speeds. This prevents heavy current flow through the system that might otherwise take place due to the low inductive reactance of the receiver windings 26, 27 and 28 at low vehicle speeds.

The diodes 55, 56 and 57 are poled so that electrical energy that is stored in the magnetic fields of the windings 26, 27 and 28 may pass through these diodes and charge the capacitor 50 in a direction to increase the bias on the base 23 of the transistor 14 and to increase the conduction of this transistor. As shown, these diodes will pass the positive portion of the waveforms available at the windings 26, 27 and 28 when these windings are de-energized. This will place a positive charge on the plate of the capacitor 50 that is connected to lead 51 with respect to the plate that is connected to the lead 31. This will in turn bias the base 23 of the transistor 14 more positive with respect to the emitter 25 and increase the conduction of the transistor 14.

It can readily be appreciated that the increase in conduction of the transistor 14 will increase as a function of vehicle speed. The greater switching speeds by the sender 10 of the windings 26, 27 and 28 will result in higher frequency energization and de-energization of the receiver windings 26, 27 and 28. As a result, a greater average positive charge will be present on the plate of the capacitor connected to the lead 51 at greater vehicle speeds. This charge appears as a greater positive average voltage at the base 23 of the transistor 14.

The increase in conduction of the transistor 14 provides more electrical energy at the windings 26, 27 and 28 at high vehicle speeds when the inductive reactances of these windings are the greatest. This increased electrical energy is sufficient to apply sufficient torque to the rotor 71 so that the speedometer mechanism 72 may be properly actuated. On the other hand, at low vehicle speeds or at standstill, the system will draw minimum current thereby minimizing damage that might otherwise occur as the result of excessive currents. This action also minimizes the amount of current consumed by the speedometer at all speed ranges.

It is apparent that other solid state devices may be used in place of the transistor 14, and that the circuit formed by the emitter and collector can properly be called a load circuit, with these two electrodes being denoted load electrodes. The circuit formed by the emitter and base of the transistor 14 may properly be denoted as a control circuit with the base 23 being termed a control electrode.

The present invention thus provides a reliable and efficient electrical speedometer system for a motor vehicle in which sufficient energy is always available to properly operate an indicating mechanism and in which current drawn at low vehicle speeds is minimized. This is accomplished through the action of a regulator means, preferably in the form of a transistor or other solid state device, in which the conduction of the transistor or other solid state device is increased as the vehicle speed increases.

It will be understood that the invention is not to be limited to the exact construction shown and described, but that various changes and modifications may be made without departing from the spirit and scope of the invention as defined in the appended claims.

We claim:

1. In an electrically operated speedometer for a motor vehicle, a source of electrical energy, a receiver having a plurality of windings and a rotor driven by said windings, a speed indicating means, said rotor being connected to said speed indicating means, means adapted to be driven by a rotatable portion of a motor vehicle at a speed indicative of motor speed, said means coupled to said source of electrical energy and said windings and having means for sequentially energizing said windings from said source of electrical energy, a transistor having an emitter, a collector and a base, said emitter and collector being connected in series circuit with said source of electrical energy and said windings, and means coupled to said base for causing the conduction of said transistor to increase as a function of increasing vehicle speed.

2. In an electrically operated speedometer for a motor vehicle, a source of electrical energy, an electrical motor having a plurality of windings and a rotor driven by said windings, a speed indicating means, said rotor being connected to said speed indicating means, means adapted to be driven by a rotatable portion of a motor vehicle at a speed indicative of motor speed, said means coupled to said source of electrical energy and said windings and having means for sequentially energizing said windings from said source of electrical energy, a transistor having an emitter, a collector and a base, said emitter and collector being connected in series circuit with said source of electrical energy and said windings, and means connected to said base for causing the conduction of said transistor to increase as the speed of the motor vehicle increases whereby increased electrical energy is available to energize said motor windings as the frequency of energization increases.

3. In an electrically operated speedometer for a motor vehicle, a source of electrical energy, an electrical receiver having a plurality of windings and a rotor driven by said windings, a speed indicating means coupled to said rotor, sender means adapted to be driven by a rotatable portion of a motor vehicle at a speed indicative of motor vehicle speed, said sender means coupled to a source of electrical energy and said windings and having means for sequentially energizing said windings from said source of electrical energy, a solid state electrical device having a control circuit and a load circuit, said load circuit being connected in series circuit with said source of electrical energy and said windings, and means coupled to said control circuit for causing the conduction of said solid state electrical device to increase as the speed of the motor vehicle increases.

4. In an electrically operated speedometer for a motor vehicle, a source of electrical energy, an electrical receiver having a plurality of windings and a rotor driven by said windings, a speed indicating means coupled to said rotor, means adapted to be driven by a rotatable portion of a motor vehicle at a speed indicative of motor vehicle speed, said means coupled to a source of electrical energy and said windings and having means for sequentially energizing said windings from said source of electrical energy, a solid state electrical device having a control circuit and a load circuit, said load circuit being connected in series circuit with said source of electrical energy and said windings, and means coupled to said control circuit for causing the conduction of said solid state electrical device to increase as the speed of the motor vehicle increases, said last mentioned means including a capacitor coupled to said control circuit and diodes equal in number to said windings and individually connected at one end to respective ones of said windings and collectively at the other ends to said capacitor, each diode being poled to increase the charge of said capacitor of a polarity to cause the conduction of said solid state device to increase as the speed of the motor vehicle increases.

5. In an electrically operated speedometer for a motor vehicle, a source of electrical energy, an electrical receiver having a plurality of windings and a rotor driven by said windings, a speed indicating means coupled to said rotor, means adapted to be driven by a rotatable portion of a motor vehicle at a speed indicative of motor vehicle speed, said means coupled to a source of electrical energy and said windings and having means for sequentially energizing said windings from said source of electrical energy, a transistor having a collector, an emitter and a base, said collector and emitter being connected in series circuit with said source of electrical energy and said windings, a capacitor having one end thereof connected to one end of each of said windings and a second end thereof connected to said base, a plurality of diodes equal in number to the number of said windings with each diode being connected at the anode end thereof to the other end of an individual one of said windings and at the cathode end thereof to said base and said capacitor, each diode being poled to charge said capacitor in a direction to increase the conduction of said transistor as the charge of said capacitor increases whereby the conduction of said transistor increases and the electrical energy available to said windings increases as the speed of the motor vehicle increases.

References Cited by the Examiner
UNITED STATES PATENTS

| | | | |
|---|---|---|---|
| 2,402,928 | 6/1946 | Summers | 250—233 |
| 2,461,511 | 2/1949 | Baecher | 318—27 |
| 2,649,559 | 8/1953 | Wargo | 324—70 |

WALTER L. CARLSON, *Primary Examiner.*

RUDOLPH V. ROLINEC, *Examiner.*

M. J. LYNCH, *Assistant Examiner.*